United States Patent
Borreggine et al.

(10) Patent No.: US 8,938,897 B2
(45) Date of Patent: Jan. 27, 2015

(54) LED TRUCK LOGO LIGHTING

(75) Inventors: Peter Anthony Borreggine, Las Vegas, NV (US); Gaston Ivan Bilbao, Las Vegas, NV (US)

(73) Assignee: Peter Anthony Borreggine, Las Vegas, NV (US)

( * ) Notice: Subject to any disclaimer, the term of this patent is extended or adjusted under 35 U.S.C. 154(b) by 135 days.

(21) Appl. No.: 12/723,242

(22) Filed: Mar. 12, 2010

(65) Prior Publication Data

US 2011/0219651 A1  Sep. 15, 2011

(51) Int. Cl.
*G09F 21/04* (2006.01)
*B60Q 1/50* (2006.01)
*G09F 9/33* (2006.01)
*B62D 35/00* (2006.01)

(52) U.S. Cl.
CPC ...... *B60Q 1/503* (2013.01); *G09F 9/33* (2013.01); *G09F 21/04* (2013.01); *B62D 35/001* (2013.01)
USPC .............. 40/541; 40/588; 40/592; 40/606.12; 40/738; 40/643; 40/591; 40/593; 40/589; 40/590

(58) Field of Classification Search
CPC ........................................................ G09F 21/04
USPC .............. 40/541, 588, 592, 606.12, 738, 643, 40/591, 593, 589, 590; 296/180.4
See application file for complete search history.

(56) References Cited

U.S. PATENT DOCUMENTS

| | | | | |
|---|---|---|---|---|
| 4,135,754 A * | 1/1979 | FitzGerald et al. | | 296/15 |
| 4,557,517 A * | 12/1985 | Bolduc et al. | | 362/485 |
| 4,617,617 A | 10/1986 | Cunningham et al. | | |
| 4,733,719 A * | 3/1988 | Levine | | 165/238 |
| 5,685,099 A * | 11/1997 | Favata | | 40/590 |
| 6,441,943 B1 | 8/2002 | Roberts et al. | | |
| 6,821,007 B1 * | 11/2004 | Olman et al. | | 362/511 |
| 2003/0198057 A1 * | 10/2003 | Groeller | | 362/485 |
| 2005/0001433 A1 * | 1/2005 | Seelin | | 290/44 |
| 2006/0143957 A1 * | 7/2006 | Salehi | | 40/590 |
| 2007/0234612 A1 * | 10/2007 | Corbishley et al. | | 40/591 |

* cited by examiner

*Primary Examiner* — Syed A Islam
(74) *Attorney, Agent, or Firm* — Armstrong Teasdale LLP

(57) ABSTRACT

In combination with a highway tractor of the type having an operator's cab mounted on a frame, a vertical pivotal coupling means coupled to the frame behind the cab adapted to be coupled to a trailer, and an aerodynamic structure at the top of the cab which includes a plurality of LED bulbs and a heat generating element in the front of the aerodynamic structure. A front panel of glass or plastic material having information such as a logo containing letters and/or images located on its first surface, second surface or embedded surface covers the LED bulbs with a weatherproof seal. Light from the LED bulbs provides illumination for the information on the front panel to be viewed from the front of the highway tractor and heat from the heat generating element helps to keep the front panel having information such as a logo free of snow and/or ice.

19 Claims, 2 Drawing Sheets

LED TRUCK LOGO LIGHTING

BACKGROUND OF THE INVENTION

1. Field of the Invention

The present invention relates generally to an enclosure having a lighted information located on the top of the cab of a tractor trailer and, more specifically, to an enclosure having a plurality of LED's which provide light for illuminating a logo having words and/or images on the first surface, second surface or embedded surface of a light transmitting glass, polycarbonate, glass, etc. panel.

2. Description of Related Art

Apparatus for displaying information on a car or a truck is known in the prior art. More specifically, by way of example, U.S. Pat. No. 7,449,998 to Au, et al., discloses an electronic display panel for displaying messages on top of a vehicle such as a taxicab. The display unit includes at least two display panels facing outward respectively. The display unit is controlled by a computing device to display various messages. In one embodiment, the vehicle is provided with a Global Positioning System (GPS) that determines a location of the vehicle. Coupled to the GPS, the computing device sends the location information of the vehicle to a base station and receives returned information from the base station in accordance with the location information. The returned information is locally processed for display on the display panels.

U.S. Pat. No. 6,955,455 to Schneider discloses a lighted sign for application to a vehicle surface includes first and second metallic layers with a magnetic plate sandwiched therebetween. The second metallic layer includes a circumference smaller than that of the magnetic plate such that it is pressed against a vehicle surface when the magnetic plate is magnetically adhered thereto. A light source is coupled to the magnetic plate with a positive wire connected to the first metallic layer and a negative wire connected to the second layer such that the light source emits light when the first metallic layer is energized by a vehicle electrical power source and is grounded when the second metallic layer is pressed against the vehicle metallic surface. The magnetic plate and first metallic surface include cutouts so that light may be emitted by the light source therethrough. The lighted sign includes a microcontroller and environmental sensors for advanced lighting control.

U.S. Pat. No. 6,942,366 to Mohacsi discloses a light fixture for illuminating a sign. The light fixture has a lamp and one or more reflectors to provide for substantially uniform illumination of a sign. The reflectors can be made from a neutral density polymeric material consisting of a translucent or substantially transparent polymeric substrate with a pattern of reflective media disposed on or within the substrate.

U.S. Pat. No. 6,812,851 to Dukach, et al., discloses a system for publicly displaying messages on an automobile having a publicly visible electronic display; video drive circuitry for generating images (which can include advertisements) on the display. A computer can control the images on the display and the display-power circuitry can automatically reduce power to the display independently of whether the computer is operating. The system for publicly displaying messages can also include an input device which can be used by an occupant of the vehicle to generate and display one or more emergency signals.

U.S. Pat. No. 6,236,330 to Cohen discloses a mobile display system having one or more movable billboard displays which are equipped with externally viewable display panels and a controller. The display is moved from location zone to location zone by a transporter which may comprise a person or a vehicle. The controller ascertains the display location and drives the display to generate a publicly viewable message selected for viewing within such location zone. The message is displayed pursuant to a schedule which includes date, time of day and display duration while the display is within the zone or until the display is located in another zone which is not included within the message schedule. A tiered system control network includes a plurality of fixed stations which transmit message content and scheduling data to the controller and which generate billing and other accounting records U.S. Pat. No. 5,755,051 to Zumbuhl discloses a warning light and sign apparatus includes a handle assembly which includes a top end and a bottom end. A sign-receiving bracket assembly is supported by the top end of the handle assembly. A bracket-supported light assembly is supported by sign-receiving bracket assembly. A power supply assembly is supported by the handle assembly and is electrically connected to the bracket-supported light assembly. A sign is received by the sign-receiving bracket assembly and includes a first message "stop" on a first side and a second message "slow" on a second side.

The handle assembly can be easily rotated to selectively orient either the "stop" message or the "slow" message. Removable sign-to-light fasteners connect the sign to the bracket-supported light assembly.

U.S. Pat. No. 5,754,098 to Holban discloses a taxi cab emergency signal including an emergency light situated on the roof of the taxi cab. The emergency light is adapted to create a visual signal upon the receipt of power. Further included is an emergency switch discretely situated within the taxi cab adjacent to a driver thereof and electrically connected between a power source and the emergency light for allowing the supply of power thereto upon the actuation thereof.

U.S. Pat. No. 4,135,754 to FitzGerald, et al., discloses an illuminated enclosure mounted on the vertical front wall of a vehicle to reduce aerodynamic drag of the vehicle and to display a trademark, name, logo or the like. The major portion of the enclosure is first painted black so as to be substantially impervious to the passage of light. An illuminated area is covered by translucent paint or a decalcomania arranged to display the trademark, name or logo to be displayed. A lighting device is mounted on the front wall of the vehicle and connected to its electrical system. The lighting device has a plurality of spaced light bulbs arranged transversely across the midportion of the illuminated area. In use, the illuminated area is lighted from within the enclosure for observation by others as the vehicle moves along the highway.

SUMMARY OF THE INVENTION

In an exemplary embodiment of the present invention, there is disclosed, in combination with a highway tractor of the type having an operator's cab mounted on a frame, a vertical pivotal coupling means coupled to the frame behind the cab that is adapted to be coupled to a trailer, and an aerodynamic structure on the top of the cab having a frame with a plurality of LED bulbs and may have a heat generating element coupled behind the aerodynamic structure. A transparent panel having a first surface, second surface or embedded with information such as a logo containing letters and/or images located on its first surface or second surface or embedded surface is connected to the frame with a weatherproof seal. Light from the LED bulbs provides illumination for the information on the first surface, second surface or embedded surface of the front panel to be viewed from the front of the highway tractor and heat from the heat generating element helps to keep the glass, polycarbonate, glass, etc material having information such as a logo free of snow and/or ice.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
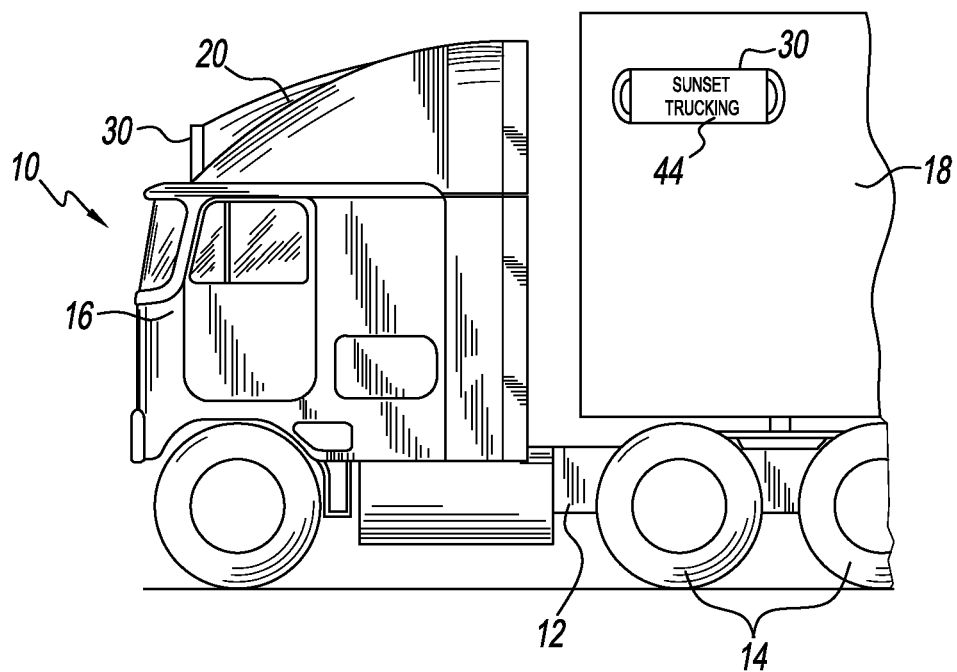
FIG. 1 is a side view of the forward portion of a high-way tractor trailer combination incorporating an illuminated logo display mounted permanently on or within the top of the cab of the tractor and a second illuminated logo display removably attached to the trailer in accordance with the principles of the invention.

Referring to FIG. 1, there is disclosed a side view of the forward portion of a high-way tractor trailer combination having an illuminated logo display permanently mounted on the cab of the tractor and a second illuminated logo display removably mounted on the side of the trailer in accordance with the principles of the invention.

The tractor 10 has a frame 12 which is mounted on double sets of tandem wheels 14 and an operator's cab 16 which is mounted over the engine. Located behind the cab is a semitrailer 18 which is attached to the frame with a conventional fifth wheel assembly.

Mounted on the roof of cab 16 is an aerodynamic structure 20 which has rigid front, top and side members which may be composed of sheet metal or fiberglass or polycarbonate panels that extend upwardly from the base of the cab to a short distance below the roof line of the trailer.

The aerodynamic structure 20 is a part of a molded cab or a conventional rigid wind deflector that extends from a relatively narrow front end of the cab roof and slopes rearwardly left and right to provide a rigid aerodynamic structure for reducing tractor-trailer drag on a conventional tractor trailer combination. Structure 20 is designed to cause the airstream which passes along the top and sides of the cab to flow to the top and sides of the trailer with minimum turbulence.

Located on the front of wind deflector, or built in as part of the wind deflector 20 is a weather proof illuminated enclosure 30 having a support member and a light transmitting cover for displaying information 44 such as a logo which can have words and/or images.

Figure 2:
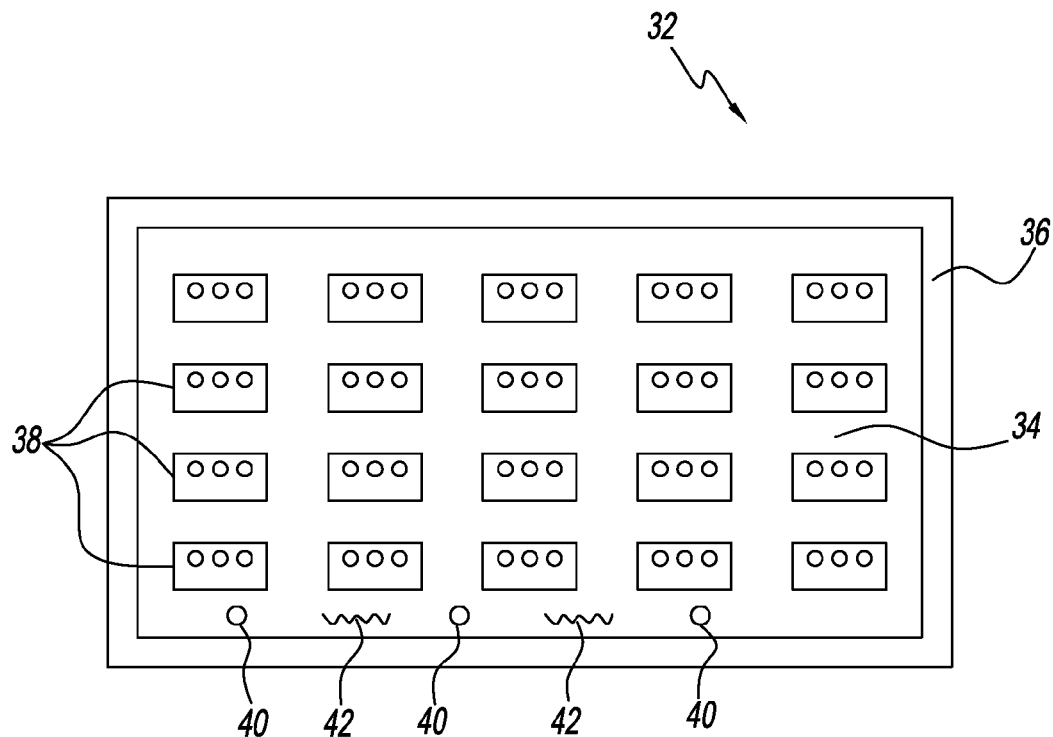
FIG. 2 is a front view of a support member having LED modules for providing substantially uniform light in accordance with the principles of the invention.

Referring to FIG. 2, there is shown a front view of the support member 32 having a rear panel 34 and a rim 36. Mounted on the rear panel 34 are a plurality of LED modules 38 arranged in rows and columns where each module, which can have one or more LED bulbs, which can be replaced if an LED in a module becomes defective. The light emitting modules are connected in a series and parallel relationship to the battery of the truck thru a switch such as a light switch, the ignition switch or an in-cab switch. Thus, the LED's are energized when the switch is on, and the LED's are off when the switch is off. It is known that LED's produce little heat while they operate. Therefore, unless an additional source of heat is provided during winter driving conditions, a layer of snow and/or ice can build up and cover the front of enclosure 30. To prevent this build up of snow and/or ice, a heat generating element can be located within enclosure 30. Therefore, also located on the rear panel 34 is at least one heat generating element such as an incandescent bulb 40 and/or a resistor 42. The heat generating element can be located at the bottom of the rear panel so that the heat generated by the heat generating element will heat the air trapped in the weather proof enclosure 30 when the outside air temperature is at or below freezing, and particularly when it is snowing to help keep the face panel on the front of the weather proof enclosure, which displays information such as a logo, free of snow and/or ice. The heat generating element can be connected to a separate on-off switch which can be controlled by a person in the cab, or it can be connected to a thermostat which is set to automatically supply power to the heat generating element when the temperature in enclosure 30 falls below freezing.

LED light bulbs are miniature bulbs that do not use filaments to produce light. Therefore the life of an LED is much longer than that of a regular incandescent bulb because there is no filament to burn out. Incandescent bulbs also tend to be much larger in size due to the filament, which must be housed in a vacuum inside the bulb. LED light bulbs are housed in a durable plastic rather than glass and perhaps most importantly, are more efficient. In traditional incandescent bulbs heat is generated when the filament is activated to produce light. This causes energy to be wasted on the production of heat rather than the production of light. With LED's, almost no heat is produced when they are activated. In order to product the same amount of light as a LED, an incandescent bulb would have to work even harder.

Figure 3:
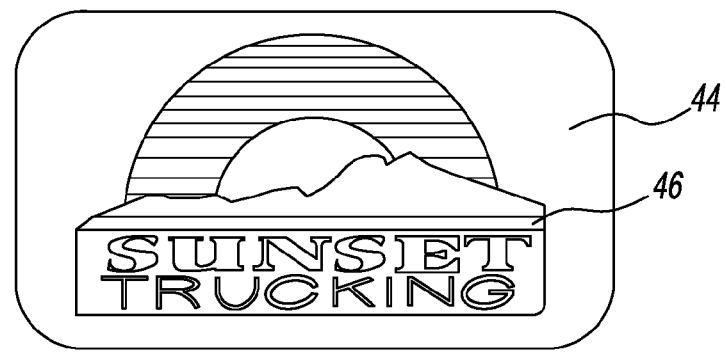
FIG. 3 is a front view of a face plate which is attached to the front of the frame within which are LED's in accordance with the principles of the invention.

Attached to the rim 36 of the support member 32 is a front or face panel made of a material such as glass, polycarbonate, plastic, etc. which displays information such as a logo, see FIG. 3. Polycarbonate is a versatile, tough plastic used for a variety of applications, one of which is bullet proof windows. The main advantage of polycarbonate over other types of plastic is its unbeatable strength combined with light weight. While acrylic is about 17% stronger than glass, polycarbonate is nearly unbreakable. Bullet proof windows and enclosures as seen inside banks or at drive thru businesses are often made of polycarbonate material.

The panel 44 is formed to fit on rim 36 with a weather proof seal. Located on the first surface, second surface or embedded surface of the panel is information such as a logo 46, shown in FIG. 3 as "SUNSET TRUCKING". The logo can either be printed or molded on the first surface, second surface or embedded on the panel 44 or located on a thin sheet of vinyl which is applied to the first surface, second surface or both surfaces of the panel 44. As the LEDs are individual light sources, an intermediate panel of frosted material such as a sheet of glass or plastic which has been roughened by sand blasting or the like can be located between the LED's and the panel 44 to defuse the light from individual LED's and provide a uniform source of light for lighting the information on the panel 44. The frosted material can also prevent bright spots of light from individual LED's from appearing on the surface of panel 44.

As noted above, LED's generate little heat. Therefore, when a truck is traveling on a high way during a snow storm, snow and/or ice can accumulate on the front surface of the panel and obscure the logo from being read. To prevent this from happening, a heat generating element such as one or more small incandescent bulbs and/or one or more resistors can be located behind the rear surface of panel 44 to heat the air in enclosure 30 and panel 44 to melt any snow and/or ice that may accumulate on the front surface of the light transmitting panel 44.

Looking at FIG. 1, there is shown an embodiment of the invention where an illuminated logo display is removably attached to the side of the trailer of a high way tractor trailer combination in accordance with the principles of the invention. In this embodiment, the frame and panel are removably attached to the side of the trailer and electrically connected to enclosure 30 which is permanently located on the top of the cab or molded as a part of the cab.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are entitled.

What is claimed is:

1. In combination with a highway tractor of the type having an operator's cab mounted on a frame, a vertical pivotal coupling means coupled to said frame behind said cab adapted to be coupled to a trailer, and an aerodynamic structure having a front arcuate surface and coupled to the top of the cab comprising:
   a support member including:
      a rear panel having a rim, and
      a plurality of bulbs mounted to the rear panel,
   a back surface of the support member coupled directly to a front arcuate surface of the aerodynamic structure so that the support member is non-flush with the aerodynamic structure, said back surface including an arcuate cross-section that matches the front arcuate surface of the aerodynamic structure; and
   a front panel coupled to said support member with a weatherproof seal, said front panel having information including at least one of letters and images located on a first surface, a second surface or an embedded surface of the front panel; wherein light from the plurality of bulbs provides illumination for the information to be viewed from the front of the highway tractor.

2. The apparatus of claim 1 wherein said front panel is of a transparent material which includes glass, plastic or polycarbonate.

3. The apparatus of claim 2 whereon said information on the first surface, second surface or embedded surface of said front panel is painted or printed.

4. The apparatus of claim 2 whereon said information on the first surface, second surface or embedded surface of said front panel is on a vinyl sheet.

5. The apparatus of claim 2 wherein the plurality of bulbs comprise a plurality of LED bulbs and are located in modules wherein each module has at least one LED bulb.

6. The apparatus of claim 5 wherein said modules are individually replaceable.

7. The apparatus of claim 2 wherein a heat generating element is located behind said front panel.

8. The apparatus of claim 7 wherein said heat generating element is connected to an adjustable thermostat.

9. The apparatus of claim 7 wherein said heat generating element is an incandescent bulb.

10. The apparatus of claim 7 wherein said heat generating element is a resistor.

11. The apparatus of claim 9 wherein activation of said heat generating element is by a switch located in the operator's cab.

12. The apparatus of claim 9 wherein activation of said heat generating element is by a thermostat which can be adjustable.

13. The apparatus of claim 12 wherein said thermostat is set to activate said heat generating element when the temperature reaches 32 degrees F. or below.

14. The apparatus of claim 10 wherein activation of said heat generating element is by a switch located in the operator's cab.

15. The apparatus of claim 10 wherein activation of said heat generating element is by a thermostat.

16. The apparatus of claim 15 wherein said thermostat is set to activate said heat generating element when the temperature reaches 32 degrees F. or below.

17. The apparatus of claim 6 wherein activation of said plurality of LED's is by a switch located in the operator's cab.

18. The apparatus of 2 wherein a light transmitting frosted panel or diffuser is located between the bulbs and the front panel.

19. The apparatus of claim 1 further comprising a frame having a plurality of LED bulbs coupled to the side of the trailer; and a front panel coupled to said frame with a weatherproof seal, said front panel having information such as a logo having letters and/or images located on its first surface, second surface or embedded surface; wherein light from the LED bulbs provides illumination for the information on the front panel to be viewed from the side of the highway trailer of the tractor trailer.

\* \* \* \* \*